United States Patent [19]

Gerety

[11] Patent Number: 4,638,311

[45] Date of Patent: Jan. 20, 1987

[54] APPARATUS FOR PROVIDING MASTERLESS COLLISION DETECTION

[75] Inventor: Eugene P. Gerety, Wolcott, Conn.

[73] Assignee: ITT Corporation, New York, N.Y.

[21] Appl. No.: 670,701

[22] Filed: Nov. 13, 1984

[51] Int. Cl.[4] .............................................. H04H 1/00
[52] U.S. Cl. ............................. 340/825.06; 340/825.5; 340/825.51; 370/85
[58] Field of Search ................... 364/200, 551; 370/85, 370/94; 455/58; 361/392–395, 413; 340/825.5, 825.51, 825.06, 825.08

[56] References Cited

U.S. PATENT DOCUMENTS

| | | | |
|---|---|---|---|
| 3,992,686 | 11/1976 | Canning | 361/424 X |
| 4,161,786 | 7/1979 | Hopkins et al. | 370/94 X |
| 4,281,380 | 7/1981 | DeMesa, III et al. | 340/825.5 |
| 4,337,465 | 6/1982 | Spracklen et al. | 370/85 X |
| 4,359,731 | 11/1982 | Beauford et al. | 340/825.51 |
| 4,511,950 | 4/1985 | Bunner et al. | 361/413 |
| 4,517,637 | 5/1985 | Cassell | 364/551 X |
| 4,535,448 | 8/1985 | Baxter et al. | 370/85 |

OTHER PUBLICATIONS

William H. Hayt et al., "Engineering Circuit Analysis", McGraw Hill, New York, 1962, pp. 72–77.

Primary Examiner—Ulysses Weldon
Attorney, Agent, or Firm—Peter C. Van Der Sluys; Robert A. Hays

[57] ABSTRACT

An apparatus for providing masterless collision detection in a communication network includes a distinct data transmission bus and distinct collision detection reference bus. A voltage on the reference bus is monitored by each element to ascertain the existence of a change in the voltage which results in either the enabling or disabling of data transmission on the transmission bus by that element.

20 Claims, 5 Drawing Figures

APPARATUS FOR PROVIDING MASTERLESS COLLISION DETECTION

BACKGROUND OF THE INVENTION

The present invention generally relates to an apparatus for regulating the transmission of data within a data communication system and, in particular, relates to such an apparatus for the masterless control of data traffic among a plurality of closely spaced interface devices each having one or more external peripherals interconnected therewith.

In modern communication networks a plurality of data transmit/receive elements, each capable of transmitting and receiving data signals, are interconnected for the exchange of information therebetween. The interconnection is frequently by means of a common communication medium, such as a coaxial cable. Naturally, if more than one such element were to simultaneously transmit data onto the common communication medium excessive errors and data loss would occur and the network would be quite unacceptable. Consequently, one major consideration in the design of such communication networks must be the regulation, or allocation, of the transmission time among the subscribers, or users, in a fair and efficient manner so that undue delays or other inconveniences are avoided when attempting to transmit information. This consideration persists regardless of the magnitude of the network designed, i.e., a long-haul network, a local area network, or a short-haul local area network.

At the present time and, as anticipated for years to come, one of the primary systems of interest for many groups of users is either a local area network (LAN) or a short-haul local area network (SHLAN). Such networks are generally employed in geographically concentrated facilities, such as a university or a business site, and include a plurality of nodes each having a number of peripheral devices connected thereto.

At the present time, the control of such nodes is available on very large-scale integrated (VLSI) circuit chips. These nodal VLSI circuit chips are then interconnected to provide communication services with other similar nodes to form, for example, a short-haul local area network. This design consideration can be characterized as the avoidance of collisions between two or more users attempting to simultaneously transmit information over a common transmission medium that interconnects a plurality of nodes.

The most conventional solution to this congestion, or collision, problem is the use of a carrier signal. That is, an analog carrier signal is transmitted, usually via coaxial cable, to each and every node on the network. Each node is adapted to detect the presence of the carrier signal. The most common scheme is known as Carrier Sense Multiple Access with Collision Detection (CSMA/CD). In such a scheme, the phrase "carrier sense" means that any data transceiver client, or subscriber, wishing to transmit "listens" first. If the communication medium is being used by another subscriber the client defers transmission. "Multiple access" indicates that any client wishing to transmit can do so without the need for a central controller. "Collision detection" defers to the fact that when the communication bus is idle any element can begin transmitting.

The carrier signal is detected at each node and serves to indicate to those nodes attempting to transmit that to do so would create a transmission collision. Consequently, when a carrier signal is detected, any other node attempting to transmit is restrained from transmitting. This restraint is often implemented by requiring an enabling signal to be provided before transmission occurs. Upon failure to receive such an enabling signal, for example, due to the detection of a carrier signal, transmission from the node is restrained.

The carrier signal, even for local area networks such as a large building, or a cluster of buildings, is, as mentioned, most frequently transmitted to each and every node via a coaxial cable. As a result, this solution can be quite expensive because the coaxial cable must be routed to each node of the network and requires expensive interface equipment.

From the above, it is apparent that schemes such as CSMA/CD for avoiding simultaneous transmission collisions become expensive due to the requirement of coaxial cable lengths and hard wire interconnections necessary to service every node.

SUMMARY OF THE INVENTION

Accordingly, it is one object of the present invention to provide an apparatus for the masterless collision detection in a communication network having a plurality of transmit/receive elements.

This object is accomplished, at least in part, by an apparatus having a distinct data transmission bus and a distinct collision detector reference bus. Each connected node, preferably prior to the transmission of data, is adapted to inject a current onto the collision detection reference bus. The level of current on the reference bus is independently monitored by each of the connected nodes. Further, each node is provided with a means for providing a signal useful for enabling or disabling the transmission of data therefrom.

Other objects and advantages will become apparent to those skilled in the art from the following detailed description read in conjunction with the attached claims and the drawings appended hereto.

DETAILED DESCRIPTION OF THE INVENTION

Figure 1:
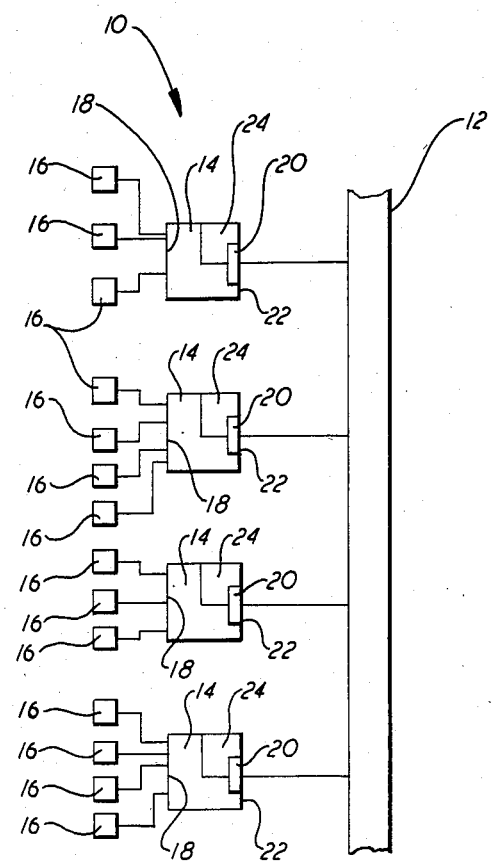
FIG. 1 is a block diagram of a data communication network having a plurality of elements, each capable of transmitting data, interconnected to a common communication bus and embodying the principles of the present invention.

A portion of a communications network, generally indicated at 10 in FIG. 1 and embodying the principles of the present invention, includes a communication bus 12 which sustains digital data signals having a plurality of nodes 14 interconnected thereto. Each node 14 is adapted to interconnect with one or more peripheral devices, hereinafter referred to as peripherals 16, on the peripheral side 18 thereof. As used herein, the term peripheral refers to any device or apparatus capable of transmitting or receiving data, including, but not limited to, a computer terminal or a communication system. In addition, each node 14 interconnects with a collision detection apparatus 20 on the communication bus side 22 thereof. Further, each node 14 includes therein a traffic control means 24 for receiving data from the peripherals 16 and for regulating the transmission of that data onto the communication bus 12. Additionally, the traffic control means 24 also receives information from the communication bus 12 and, in conjunction with a local microprocessor, distributes it to the designated peripheral 16 interconnected thereto.

In the preferred embodiment, each node 14 includes at least one VLSI circuit chip which provides the traffic controlling means 24 and which has a specific set of binary signal ports. These binary signal ports are, for all intents and purposes, conventional to such chips throughout the telecommunication industry.

Figure 2:
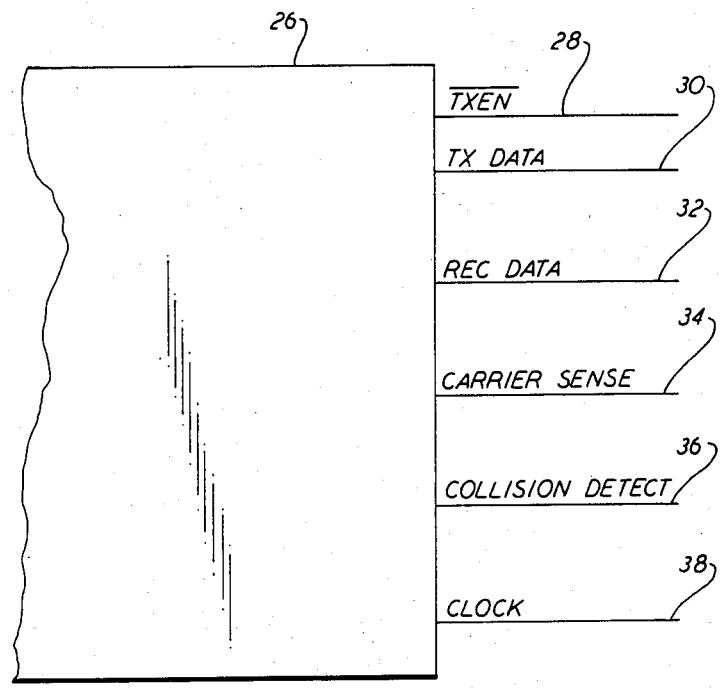
FIG. 2 is a block diagram of a traffic controller element useful in the present apparatus.

For example, as shown in FIG. 2, a typical VLSI nodal chip 26 includes a transmit enable port 28, a data transmission port 30, a data receive port 32, a carrier sense port 34, a collision detection port 36, and a transmit/receive clock port 38. The transmit/receive ports 38 are primarily employed to regulate the sequence and synchronization of transmitted/received data to/from the communication bus 12.

The transmit enable port 28 is adapted so that the binary output thereat changes state when the node 14 is prepared to transmit data onto the communication bus 12. The transmit port 30 and the receive port 32 change binary state according to the data transmitted or received. The carrier sense port 34 is adapted to signal the internal circuitry of the chip 26 of possible malfunctions on the bus 12. The carrier detection port 36 is used as a binary state control for the allowance or disallowance of transmission for the chip 26. The clock port 38, when used, regulates the sequence and synchronization of data to and from the communication bus 12. As stated, the inputs to and outputs from the ports of the chip 26 are binary in nature. That is, each port responds to only two states, i.e. a zero (or low) or a one (or high), regardless of the actual measurable voltage appearing thereat.

In conventional systems, the carrier sense port 34 and the collision detect port 36 require the inclusion of an analog circuit means between the ports, 34 and 36, and the communication bus 12 to monitor and detect the analog carrier signal thereon. In addition, the analog signals must be converted to binary signals required at the ports of the VLSI chip 26. Further, one industry standard, i.e. IEEE 802.3, requires the interconnecting cable to be a low noise, shielded 50 ohm coaxial cable no longer than about 500 meters in length per segment.

Preferably, the VLSI nodal chip 26 is, for example, either an Intel 82586, manufactured and marketed by Intel Corporation of Santa Clara, Calif., or an AMD 7990 manufactured and marketed by Advanced Micro Devices of Sunnyvale, Calif., although the functional equivalent thereof can also be used. Such a chip 26 is relatively well known in the industry and the outputs, or connections, thereto are fairly standard. The major difference between the various known networks lies in the circuitry and mechanism used to convert the analog carrier on the communication bus to the digital inputs required by the VLSI chip.

It has been found, however, that many advantages are derived if the nodes 14 of, for example, a short-haul local area network are closely spaced and if each node 14 is capable of handling a number of peripherals 16 without direction from a central network controller, or the like. In this fashion, not only is the efficiency of the communications network 10 increased, but the reliability of data transmission improves because even if one or more nodes fail the remainder of the network is unaffected.

By so grouping the nodes 14, it is now possible to provide a collision detection mechanism via a collision detection reference bus which is distinct from the data transmission bus.

As further explained below, such a scheme additionally avoids the conventionally required implementation of single bus detection circuitry.

Figure 3:
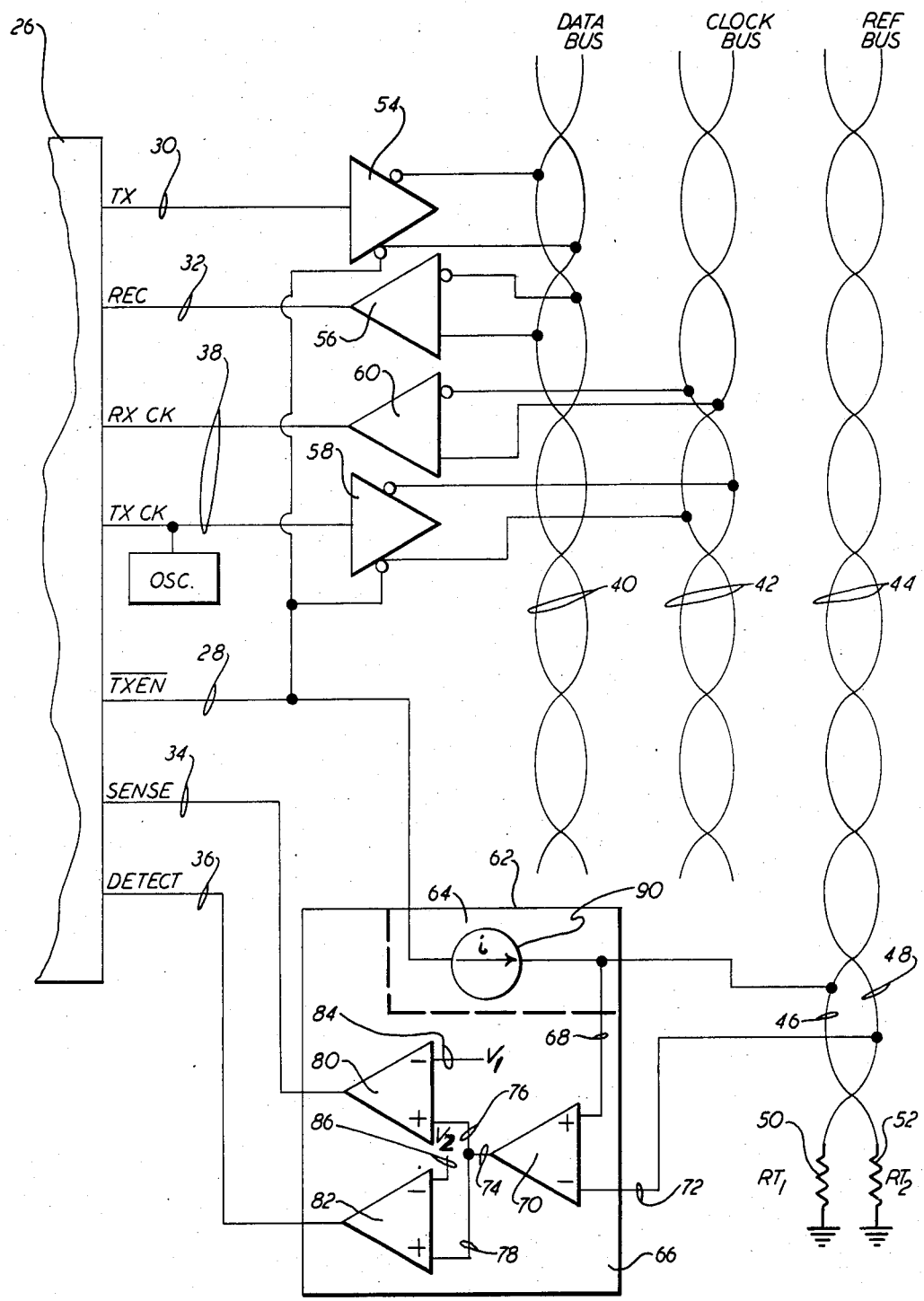
FIG. 3 is a schematic of one particular embodiment of the present invention.

With specific reference now to FIG. 3, a preferred embodiment is shown wherein the communication 12 bus of the node 14 is represented by three distinct sets of twisted pair wires, one pair 40 being used for the transmission and receipt of data, a second pair 42 being used to carry clock signals for the synchronization of the transmission and receiving of data, and the third pair 44 being the collision detection reference bus. As more fully discussed below, one preferred hardware implementation includes the use of a printed circuit board having common paired conducting strips etched thereon. Nevertheless, for the present discussion reference is made to the pair (or pairs) of conductors. The primary advantage of providing a distinct collision detection reference bus 44 is that the impedance, i.e., there is a fixed spacing, geometry and relationship to a common termination point, thereof is precisely controlled and known. The current injection wire 46 of the reference bus 44 and the sense and detect wire 48 of the reference bus 44 are grounded via resistors, 50 and 52. In the preferred embodiment the resistors, 50 and 52, are precision resistors.

The data transmission and data receiving ports, 30 and 32, respectively, are connected across the data bus 40. The transmit clock and receive clock ports 38 are connected across the clock bus 42. The sense and detect ports, 34 and 36, respectively, of the chip 26 are connected across the collision detection reference bus 44. In this embodiment, the transmit enable port 28 is connected to and controls a source of constant current.

The transmit port 30 is connected to the data transmission bus 40 by means of a tri-state differential driver 54, which driver 54 is controlled by a signal from the transmit enable port 28. The data receive port 32 is connected to the data transmission bus 40 via a differential driver 56, the inputs to which are connected across the data transmission bus 40. Similarly, the receive and transmit clock ports 38 are connected to the clock bus 42 by means of differential drivers, 58 and 60, respectively. Although the communication bus 12, as shown in FIG. 3, includes a clock bus 42, such inclusion is unnecessary if the network data transmission includes a self-clocking encoding/decoding mechanism such as, for example, via Manchester coding or a NRZI (non-return-to-zero-inverse) scheme.

The transmit enable, the collision sense and the collision detect ports, 28, 34 and 36, respectively, interconnect with the collision detection reference bus 44 by means of a collision detection device 62. The collision detection device 62 includes a current source segment 64 and a collision detection segment 66. The current injection from the current source segment 64 onto the reference bus 44 is initiated by a change in the binary state at the transmit enable port 28. For example, when the chip 26 has data to transmit, the transmit enable port 28 changes from a binary high state to a binary low state to trigger the current source segment 64 to gate a current onto current inject wire 46 of the reference bus 44. This same current is simultaneously applied to, and establishes a corresponding voltage on, one side 68 of a differential amplifier 70. The other input side 72 of the differential amplifier 70 is connected to the source and detect wire 48 of the reference bus 44. Consequently, the output side 74 of the differential amplifier 70 is indicative of the difference in the currents on the conductors of the reference bus 44. Since the impedance of the reference bus 44 is fixed and accurately known, and the impedance of the differential amplifier 70 is selected to be very much greater than the resistor 50, the voltage at the one side 68 of the differential amplifier 70 effectively represents the product of the number of current source segments 64 injecting current onto the current injection wire 46 times the current injected. In the preferred embodiment the resistors, 50 and 52, are identical whereby any leakage current on the reference bus 44 is differentially balanced. As an alternative, the resistor 52 can be omitted and the sense and detect wire 48 connected directly to ground. The choice of a differential amplifier 70 having an impedance, for example of about 1012 ohms, much greater than the resistors, 50 and 52, such as about 100 ohms, each, minimizes the loading of the reference bus 44.

The output of the differential amplifier 70 in the collision detection segment 66 is provided in one embodiment, to the high sides, 76 and 78, two other voltage comparators, 80 and 82 respectively, which voltage comparators, 80 and 82, have reference voltages V1 and V2, on the low sides, 84 and 86, respectively, thereof. The reference voltage V1 is chosen such that the output of the voltage comparator 80 changes the effective binary state thereof only when one current source segment 64 in the network 10 is injecting current onto the current injection wire 46. The reference voltage V2 is chosen such that the output of the voltage comparator 82 changes the effective binary state thereof if two or more current source segments 64 are injecting current onto the current injection wire 46. Hence, the output of the comparators, 80 and 82, are indicative of the presence of one injected current in one instance and, in the case of the second voltage comparator 82, indicative of the presence of more than a single injected current level on the reference bus 44.

Such a sensing recognizes possible malfunctions of the system and simultaneously ascertains the level of activity on the collision detection reference bus 44. A malfunction is recognized if the transmit enable port 28 has been gated to inject a current onto the collision detection reference bus 44, but the sensing port 34 of the chip 26 does not indicate the existence of such a current. Consequently, if the outputs from the voltage comparators, 80 and 82, indicate that only a single node 14 is attempting to transmit on the transmission bus 40, the transmit enable port 28 will gate an enabling signal to the transmit port driver 54, whereby transmission from the node 14 occurs. Alternatively, should the voltage comparator 82 indicate that more than a single node 14 is attempting to transmit, the enabling signal is withheld and the transmission of data does not occur at that time. Further, in the event that a collision is detected, the transmission request signal remains on the collision detector reference bus 44 for a preselected time, which time may be programmable within the chip 26, to ensure that all transmitting nodes 14 detect the collision.

Such a sustained time is preferred to avoid collision from transmitting nodes which may not have obtained the collision status on the bus 40 prior to the node request. For example, if a node queried the reference bus 40 at the same time as another node some finite length away, both nodes, but for the sustained transmission request signals, could begin transmitting before sensing and detecting the presence of the other. This technique is commonly known in the art as jamming.

Upon refusal of a transmit enablement signal, the controller mechanism within the chip 26 proceeds to calculate a random time delay before transmission is again attempted. In one particular mechanism, the time delay includes first generating a random number and then multiplying the generated number by, for example, the number of times that particular node 14 has attempted to transmit the particular message awaiting injection onto the data bus 40. In this fashion, the time difference between any given refused attempt to transmit data and the immediately subsequent attempt to transmit data is virtually guaranteed to be different from that of any other node 14. Hence, identical continuous collisions between any two nodes 14 are substantially completely avoided.

Figure 4:
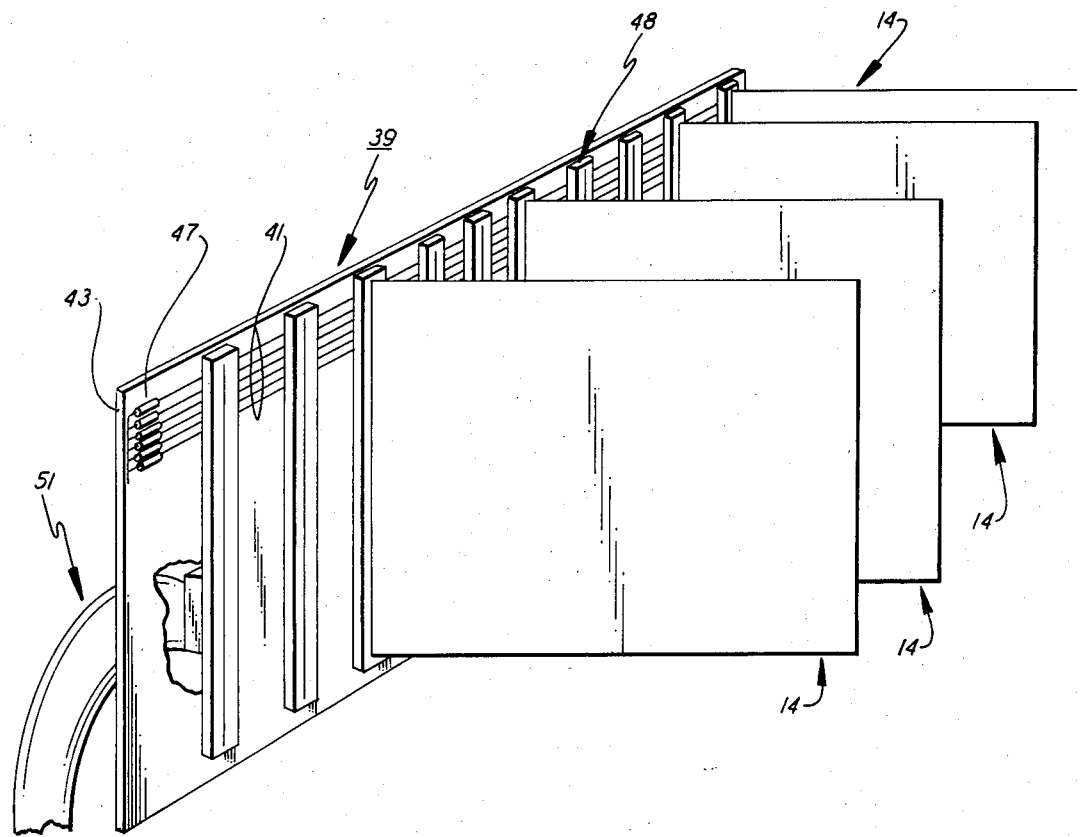
FIG. 4 is a perspective view of one hardware implementation of one embodiment of the present invention.

In the preferred embodiment, the present invention is configured as a short haul local area network 39, and, as shown in FIG. 4, is compact as well as modularly expandable. In FIG. 4 a serial backplane 41 is formed on a mother board 43, or printed circuit board. The serial backplane 41 is, in this embodiment, three strips of copper constituting the collision detection reference bus 40, the data transmission bus 42 and the clock bus 45, respectively and termination 47 therefore. The mother board 43 includes a plurality of printed circuit board connectors 49 attached thereto and interconnecting with the serial backplane 41. In this embodiment, the nodes 14 are represented as printed circuit boards. The short haul local area network 39 includes an external peripheral interconnection means 51, which may be a coaxial cable. If the short haul local area network 39 is to be interconnected with other similar networks, or to a larger system, another interconnection means, not shown in FIG. 4, would be provided. Hence, any communication between nodes 14, i.e., boards, whether within the short haul local area network 39 or through a system is regulated by the present apparatus 10.

In one preferred embodiment, the tri-state differential driver 54 and the receiver 56, are implemented via a single integrated circuit device. Further, the tri-state differential driver 58 and receiver 60 are implemented via a single integrated circuit device which is identical to the device provided for the driver 54 and receiver 56. One such device is the DS-3695 manufactured and marketed by National Semiconductor Corporation of Santa Clara, Calif.

Figure 5:
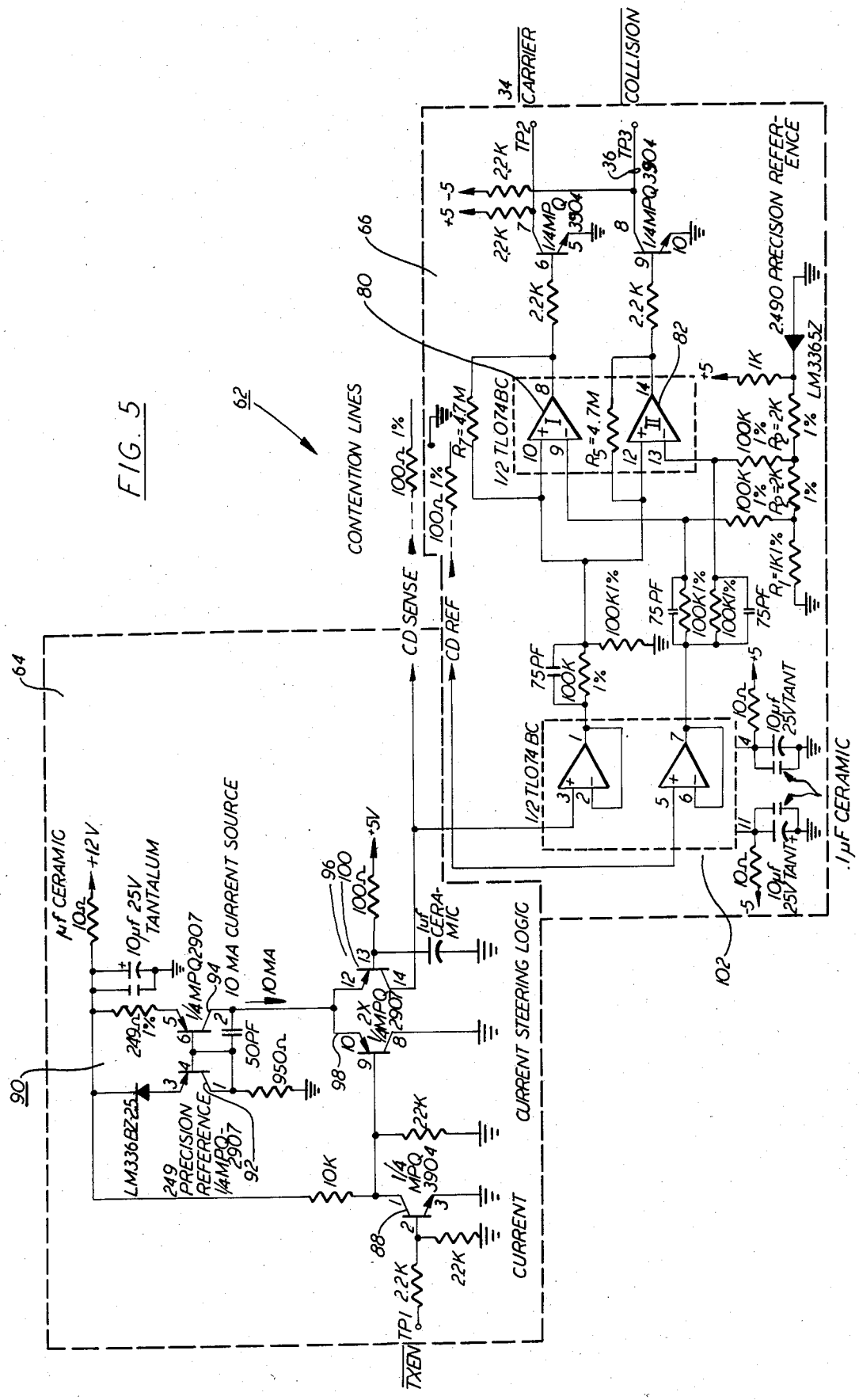
FIG. 5 is an exemplary circuit for implementing the embodiment shown in FIG. 3.

Referring specifically to FIG. 5, there is shown therein one embodiment of the collision detect device 62 including the current injection segment 64 and the collision detection segment 66. As shown, in the current injection segment 64, when the transmit enable port 28 changes state, a transistor 88 is gated whereby the current source 90 which, in this particular embodiment, includes a pair of transistors, 92 and 94, having common bases and collectors, produces approximately a 10 milliamp current. This current is then routed, via the current steering portion 96 of the current source segment 64, to the current injection wire 44. The current steering portion 96 preferably includes a pair of transistors, 98 and 100. In operation, when the transmit enable port 28 is, for example, in a binary high state the transistor 98 conducts to ground. When the transmit enable port 28 changes to a binary low state the transistor 98 biassed off and the transistor 100 biassed on to conduct the current from the current source 90 to the current injection wire 46.

The collision detection segment 66, as shown in FIG. 5, includes a buffer 102 that effectively functions as an impedance converter, i.e. from a high impedance to a low impedance, to avoid noticebly loading the bus 44. This further enhances the modular expansion of the network 39 since a plurality of such nodes 14 does not significantly change the impedance of the bus 44. Consequently, the reference voltages, V1 and V2, do not require resetting as new nodes are added.

The outputs of the buffer 102 serve as the inputs to the voltage comparators, 80 and 82. The output of the voltage comparator 80 is connected to the sensing port 34 and the output of the voltage comparator 82 is connected to the detection port 36 of the chip 26.

Although FIG. 5 is a specific detailed diagram of a preferred circuit, it is understood that similar functional circuits using different components, that nevertheless provide the same services are known in the art.

The present invention has been described herein with respect to a specific exemplary embodiment, other arrangements and configurations may be possible without departing from the spirit and scope of the invention. Consequently, the present invention is deemed limited only by the attached claims and the reasonable interpretation thereof.

What is claimed is:

1. An apparatus for providing masterless collision detection in a communication network having a plurality of nodes each being capable of transmitting data; said apparatus comprising:
    a data transmission bus, said data transmission bus being common to all of said nodes;
    a collision detection reference bus, said collision detection reference bus being common to all of said nodes and distinct from said data transmission bus;
    means, associated with each said node, for injecting a current onto said collision detection reference bus;
    means, associated with each said node, for monitoring the current on said collision detection reference bus, said monitoring means providing a signal indicative of said current said current monitoring means including a comparator having one input thereto connected to said collision detection reference bus and the other input connected to a preselected reference, said comparator generating a logic level signal only when at least two of said current injecting means are operative; and
    means, associated with each said node and responsive to said signal, for providing a signal for controlling the injection of data onto said data transmission bus.

2. Apparatus as claimed in claim 1 wherein:
    said data transmission bus is a first pair of conductors; and
    said collision detection reference bus is a second pair of conductors distinct from said data transmission bus.

3. Apparatus as claimed in claim 2 wherein said first and second pairs of conductors are conducting strips on a printed circuit board.

4. Apparatus as claimed in claim 2 wherein said first and second pairs of conductors are twisted pairs of wire.

5. Apparatus as claimed in claim 2 wherein:
    said current injecting means is connected to one conductor of said pair of conductors constituting said collision detection reference bus; and
    said current monitoring means is connected across said pair of conductors constituting said collision detection reference bus.

6. Apparatus as claimed in claim 1 wherein said collision detection reference bus has a fixed known impedance.

7. Apparatus as claimed in claim 1 wherein said current injecting means includes a constant current source.

8. Apparatus as claimed in claim 7 wherein said constant current source is controlled by a binary signal.

9. Apparatus as claimed in claim 8 wherein said binary signal is the output at the transmit enable port of a network controller device.

10. Apparatus as claimed in claim 1 wherein said current injection means is gated by a binary signal at the transmit enable port of a network controller device.

11. Apparatus as claimed in claim 1 further comprising:
    means, between said current monitoring means and said collision detection reference bus, for providing a nonloading impedance to said collision detection reference bus whereby the impedance of said collision detection reference bus is effectively unchanged regardless of the number of current monitoring means associated therewith.

12. Apparatus as claimed in claim 1 wherein said signal provided by said monitoring means is binary.

13. Apparatus as claimed in claim 1 wherein said current monitoring means includes a second comparator having one input thereto connected to said collision detection reference bus and the other input connected to a preselected reference, said second comparator generating a logic level signal only when at least one of said current injection means is operative.

14. A short haul local area network comprising:
    a first printed circuit board having a serial backplane formed thereon, said serial backplane including a first pair of conductors and a second pair of conductors, said second pair of conductors being spaced apart from said first pair of conductors;
    means for interconnecting a plurality of second printed circuit boards to said backplane, each of said boards having means thereon for independently conveying data traffic thereacross, said data traffic conveying means being adapted to query said second pair of conductors before transmitting data on said first pair of conductors;
    means for injecting a current onto said second pair of conductors;
    means for monitoring the current on said second pair of conductors, said monitoring means providing a signal indicative of said current said current monitoring means including a comparator having one input thereto connected to said second pair of conductors and the other input connected to a preselected reference, said comparator generating a logic level signal only when at least two of said current injecting means are operative; and
    means, responsive to said signal, for providing a signal for controlling the injection of data onto said first pair of conductors.

15. Network as claimed in claim 14 further comprising:
   means for interconnecting said serial backplane to at least one peripheral whereby all said second boards are effectively interconnected to said peripheral.

16. Network as claimed in claim 14 wherein said current injecting means includes a constant current source.

17. Network as claimed in claim 14 wherein said constant current source is gated by a binary signal.

18. Network as claimed in claim 14 wherein each said data traffic conveying means further comprises:
   a nodal control chip; and
   said binary signal is the output at the transmit enable port of said chip.

19. Network as claimed in claim 14 wherein each said data traffic conveying means includes:
   means, between said current monitoring means and said second pair of conductors, for providing a nonloading impedance to said second pair of conductors whereby the impedance of said second pair of conductors is effectively unchanged regardless of the number of said circuit boards connected to said serial backplane.

20. Network as claimed in claim 14 wherein said current monitoring means further includes a second comparator having one input thereto connected to said second pair of conductors and the other input connected to a preselected reference, said second comparator generating a logic level signal only when at least one of said current injection means is operative.

* * * * *